(12) United States Patent
Hoshino

(10) Patent No.: US 10,688,834 B2
(45) Date of Patent: Jun. 23, 2020

(54) TIRE

(71) Applicant: Sumitomo Rubber Industries, Ltd., Kobe-shi, Hyogo (JP)

(72) Inventor: Ryota Hoshino, Kobe (JP)

(73) Assignee: SUMITOMO RUBBER INDUSTRIES, LTD., Kobe-Shi, Hyogo (JP)

( * ) Notice: Subject to any disclaimer, the term of this patent is extended or adjusted under 35 U.S.C. 154(b) by 200 days.

(21) Appl. No.: 15/714,313

(22) Filed: Sep. 25, 2017

(65) Prior Publication Data

US 2018/0086149 A1    Mar. 29, 2018

(30) Foreign Application Priority Data

Sep. 26, 2016   (JP) ................. 2016-186912

(51) Int. Cl.
| | | |
|---|---|---|
| *B60C 11/00* | (2006.01) | |
| *B60C 11/12* | (2006.01) | |
| *B60C 11/03* | (2006.01) | |

(52) U.S. Cl.
CPC ...... *B60C 11/1263* (2013.01); *B60C 11/0304* (2013.01); *B60C 11/0306* (2013.01); *B60C 11/1204* (2013.01); *B60C 2011/0344* (2013.01); *B60C 2011/1213* (2013.01); *B60C 2011/1227* (2013.01)

(58) Field of Classification Search
CPC ..... B60C 11/12; B60C 11/03; B60C 11/1263; B60C 11/0304; B60C 11/1204; B60C 2011/1213; B60C 11/125
See application file for complete search history.

(56) References Cited

U.S. PATENT DOCUMENTS

| | | | |
|---|---|---|---|
| 5,109,904 A | | 5/1992 | Numata et al. |
| 6,968,881 B2 * | | 11/2005 | Ratliff, Jr. ........... B60C 11/0302 152/209.15 |
| 9,302,547 B2 | | 4/2016 | Tanaka |
| 9,522,574 B2 * | | 12/2016 | Hayashi ................. B60C 11/12 |
| 2012/0145295 A1 * | | 6/2012 | Yamada ............. B60C 11/0306 152/209.22 |

FOREIGN PATENT DOCUMENTS

| | | | | |
|---|---|---|---|---|
| EP | 0088876 A2 | | 9/1983 | |
| EP | 0841199 A2 * | | 5/1998 | ........... B60C 9/2006 |
| EP | 0855292 A1 * | | 7/1998 | ......... B60C 11/0309 |
| EP | 0882606 A2 | | 12/1998 | |
| JP | 2016-13820 A | | 1/2016 | |

OTHER PUBLICATIONS

Extended European Search Report, dated Feb. 5, 2018, for European Application No. 17191256.1.

* cited by examiner

*Primary Examiner* — Alison L Hindenlang
*Assistant Examiner* — Shibin Liang
(74) *Attorney, Agent, or Firm* — Birch, Stewart, Kolasch & Birch, LLP

(57) ABSTRACT

A tire 1 comprises a tread portion 2 provided with an outboard shoulder land region 8 with outboard shoulder sipes 26. The outboard shoulder sipe 26 comprises a deep bottom part 27 and a shallow bottom part 28. The shallow bottom part 28 comprises an axially outer part 30 extending axially inwardly from the axially inner end 27i of the deep bottom part 27, an axially inner part 31 extending axially outwardly from the outboard shoulder main groove 4, and a middle part 32 connecting therebetween. The axially outer part 30, axially inner part 31 and middle part 32 have different angles with respect to the tire axial direction.

12 Claims, 6 Drawing Sheets

TIRE

TECHNICAL FIELD

The present invention relates to a tire, to more particularly to a tread pattern capable of improving wet performance without sacrificing steering stability.

BACKGROUND ART

Heretofore, in order to improve wet performance of a vehicle tire, the tread portion thereof is provided with sipes so that the edges of the sipes can generate frictional force and exert an edge effect during running on wet road surfaces to thereby improve wet grip performance of the tire.
In order to further improve the wet performance, it is conceivable to increase the number of the sipes. However, as the sipes decrease the rigidity of ground contacting land regions of the tread portion, there is a possibility that steering stability of the tire is deteriorated.

SUMMARY OF THE INVENTION

It is therefore, an object of the present invention to provide a tire in which wet performance can be improved without sacrificing steering stability.

According to the present invention, a tire comprises:
a tread portion having an outboard tread edge to be positioned away from the center of a vehicle body and an inboard tread edge to be positioned close to the center of the vehicle body,
the tread portion provided with main grooves extending continuously in the tire circumferential direction so as to be axially divided into land regions,
the main grooves including an inboard shoulder main groove, an outboard shoulder main groove and a crown main groove therebetween,
the land regions including
an inboard shoulder land region defined between the inboard shoulder main groove and the inboard tread edge, and provided with inboard shoulder sipes,
an inboard middle land region defined between the inboard shoulder main groove and the crown main groove, and provided with inboard middle sipes,
an outboard middle land region defined between the crown main groove and the outboard shoulder main groove, and
an outboard shoulder land region defined between the outboard shoulder main groove and the outboard tread edge, and provided with outboard shoulder sipes,
wherein
the inboard shoulder sipes and the inboard middle sipes are inclined in the same direction with respect to the tire axial direction,
each of the outboard shoulder sipes comprises
a deep bottom part having axially inner and outer ends within the outboard shoulder land region, and
a shallow bottom part whose depth is less than the deep bottom part and extending from the axially inner end of the deep bottom part toward the tire equator,
the shallow bottom part is composed of
an axially outer part extending from the axially inner end of the deep bottom part toward the tire equator,
an axially inner part extending from the outboard shoulder main groove toward the outboard tread edge, and
a middle part connecting between the axially outer part and the axially inner part, and
the axially outer part, the axially inner part and the middle part have different angles with respect to the tire axial direction.

Further, the tire according to the present invention may include the following features (1)-(7):
(1) the angle θ3 of the middle part with respect to the tire axial direction is greater than the angle θ1 of the axially outer part with respect to the tire axial direction, and
the angle θ1 of the axially outer part is greater than the angle θ2 of the axially inner part with respect to the tire axial direction;
(2) the angle θ1 of the axially outer part is 12 to 22 degrees, the angle θ2 of the axially inner part is not greater than 10 degrees, and the angle θ3 of the middle part is 55 to 65 degrees;
(3) the inclination direction with respect to the tire axial direction of the axially outer part and the inclination direction with respect to the tire axial direction of the middle part are opposite of the inclination direction with respect to the tire axial direction of the axially inner part;
(4) the outboard middle land region is provided with outboard middle sipes inclined with respect to the tire axial direction to the same direction as the inboard middle sipes,
the outboard middle sipes include
axially outer short outboard middle sipes extending from the outboard shoulder main groove toward the tire equator and terminating within the outboard middle land region,
axially inner outboard middle sipes extending from the crown main groove toward the outboard tread edge and terminating within the outboard middle land region, and
axially outer long outboard middle sipes extending from the outboard shoulder main groove toward the tire equator and having an axial length larger than the axially outer short outboard middle sipe,
the depth of the axially outer long outboard middle sipes is greater than the depth of the axially inner outboard middle sipes, and
the depth of the axially inner outboard middle sipes is greater than the depth of the axially outer short outboard middle sipes;
(5) the radially outer surface of the outboard middle land region is provided with
axially outer outboard corner slopes at corners between the axially outer short outboard middle sipes and the outboard shoulder main groove and
axially inner outboard corner slopes at corners between the axially inner outboard middle sipes and the crown main groove;
(6) the inboard middle sipes include
traversing inboard middle sipes extending from the inboard shoulder main groove to the crown main groove,
axially outer inboard middle sipes extending from the inboard shoulder main groove toward the tire equator and terminating within the inboard middle land region, and
axially inner inboard middle sipes extending from the crown main groove toward the inboard tread edge and terminating within the inboard middle land region, and
the depth of the traversing inboard middle sipes is greater than the depth of the axially inner inboard middle sipes, and
the depth of the axially inner inboard middle sipes is greater than the depth of the axially outer inboard middle sipes;
(7) the radially outer surface of the inboard middle land region is provided with
axially outer inboard corner slopes at corners between the traversing inboard middle sipes and the inboard shoulder main groove, and axially outer inboard corner slopes at corners between the traversing inboard middle sipes and the crown main groove.

DESCRIPTION OF THE PREFERRED EMBODIMENTS

The present invention can be applied to pneumatic tires as well as non-pneumatic tires or airless tires not supported by air pressure, for various vehicles, e.g. passenger cars, heavy duty vehicles such as truck/bus tires and the like.

Taking a pneumatic tire as example, embodiments of the present invention will now be described in detail in conjunction with the accompanying drawings.

As well known in the art, a pneumatic tire comprises a tread portion 2 whose radially outer surface defines the tread, a pair of axially spaced bead portions mounted on rim seats, a pair of sidewall portions extending between the tread edges and the bead portions, a carcass extending between the bead portions through the tread portion and the sidewall portions, and a tread reinforcing belt disposed radially outside the carcass in the tread portion.

Figure 1:
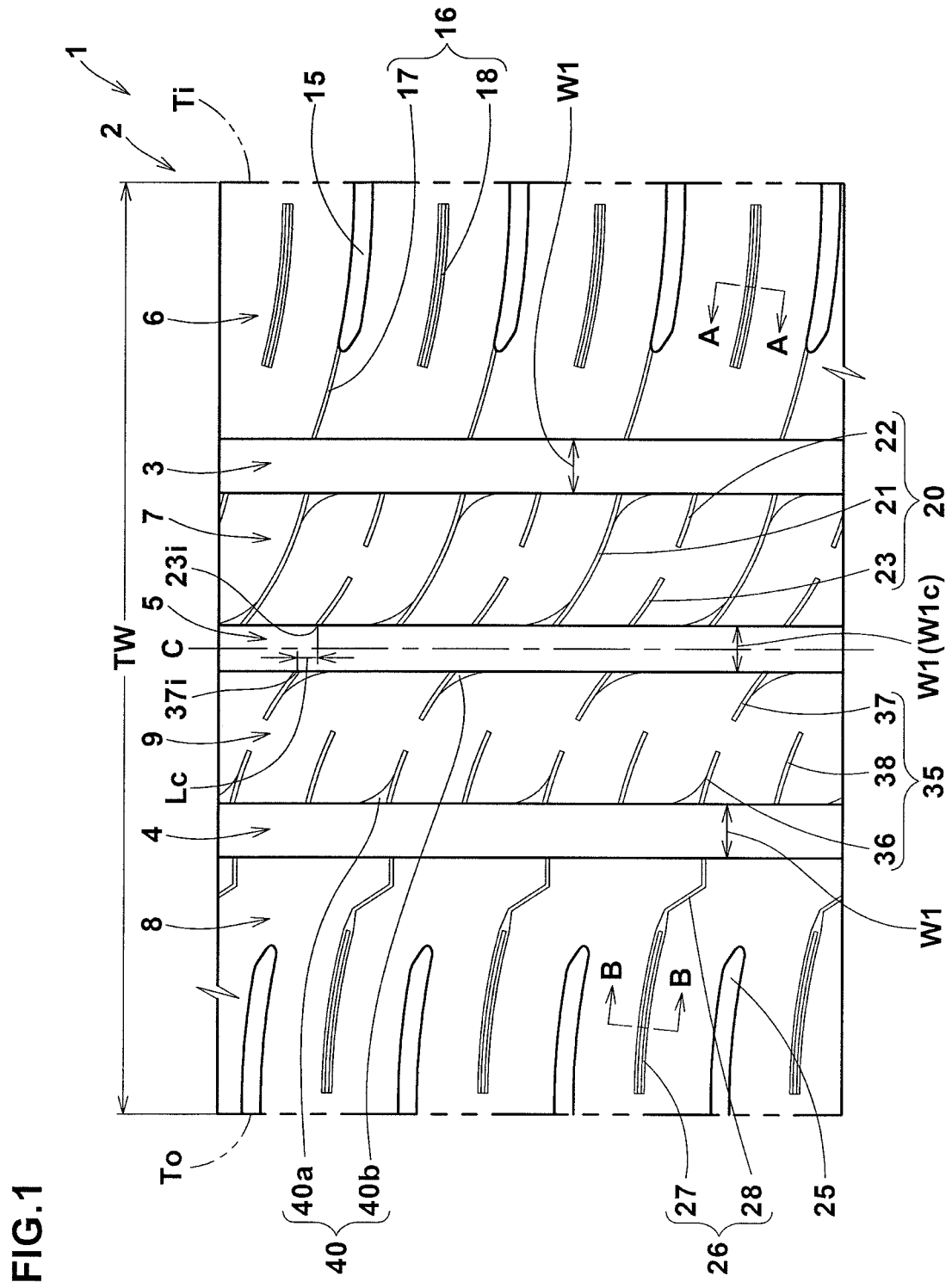
FIG. 1 is a developed partial plan view of a tire as an embodiment of the present invention showing the tread portion.

FIG. 1 shows the tread portion 2 of a tire 1 as an embodiment of the present invention which is a pneumatic tire for passenger cars.

The tread portion 2 is provided with a tread pattern of left-right asymmetry (asymmetry about the tire equator C). The mounting position of the tire with respect to a vehicle is specified.

For example, a sidewall (not shown) of the tire to be located on outside when installed on the vehicle is provided with an indication representing "outside", and a sidewall to be located on inside is provided with an indication representing "inside". Thus, the tread portion 2 has an outboard tread edge To to be positioned away from the center of the vehicle body and an inboard tread edge Ti to be positioned close to the center of the vehicle body.

According thereto, in this application, the terms "outboard" and "inboard" are used toward the outboard tread edge and inboard tread edge, respectively, to refer relative positions in the tire axial direction.

The terms "axially inner", "axially inward" and the like are used toward the tire equator, and the terms "axially outer", "axially outward" and the like are used toward the tread edge in order to refer relative positions in the tire axial direction.

The tread edges To and Ti are the axial outermost edges of the ground contacting patch of the tire which occurs under a normally inflated loaded condition when the camber angle of the tire is zero.

The undermentioned tread width TW is the width measured under a normally inflated unloaded condition, as the axial distance between the tread edges determined as above.

The normally inflated unloaded condition is such that the tire is mounted on a standard wheel rim and inflated to a standard pressure but loaded with no tire load.

The normally inflated loaded condition is such that the tire is mounted on the standard wheel rim and inflated to the standard pressure and loaded with the standard tire load.

The standard wheel rim is a wheel rim officially approved or recommended for the tire by standards organizations, i.e. JATMA (Japan and Asia), T&RA (North America), ETRTO (Europe), TRAA (Australia), STRO (Scandinavia), ALAPA (Latin America), ITTAC (India) and the like which are effective in the area where the tire is manufactured, sold or used.

The standard pressure and the standard tire load are the maximum air pressure and the maximum tire load for the tire specified by the same organization in the Air-pressure/Maximum-load Table or similar list.

For example, the standard wheel rim is the "standard rim" specified in JATMA, the "Measuring Rim" in ETRTO, the "Design Rim" in TRA or the like. The standard pressure is the "maximum air pressure" in JATMA, the "Inflation Pressure" in ETRTO, the maximum pressure given in the "Tire Load Limits at various Cold Inflation Pressures" table in TRA or the like. The standard load is the "maximum load capacity" in JATMA, the "Load Capacity" in ETRTO, the maximum value given in the above-mentioned table in TRA or the like.

In case of passenger car tires, however, the standard pressure and standard tire load are uniformly defined by 180 kPa and 88% of the maximum tire load, respectively.

In this application including specification and claims, various dimensions, positions and the like of the tire refer to those under the normally inflated unloaded condition of the tire unless otherwise noted.

The tread portion 2 is provided with three main grooves extending continuously in the tire circumferential direction. The main grooves include an inboard shoulder main groove 3 on the most inboard tread edge side, an outboard shoulder main groove 4 on the most outboard tread edge side, and a crown main groove 5 therebetween.

In the present embodiment, each of the main grooves 3, 4 and 5 is formed as a straight groove in order to smoothen the water flow and improve wet performance.

It is preferable that the groove width w1 of each of the main grooves 3-5 is set in a range from 5% to 10% of the tread width TW.

If less than 5%, there is a possibility that the wet performance is deteriorated. If greater than 10%, there is a possibility that the rigidity of the land regions is decreased, and steering stability is deteriorated.

For similar reasons, it is preferred that the groove depth D1 of each of the main grooves 3-5 is set in a range from 4 to 9 mm.

The tread portion 2 is divided by the main grooves 3-5 into an inboard shoulder land region 6 between the inboard shoulder main groove 3 and the inboard tread edge Ti, an inboard middle land region 7 between the inboard shoulder main groove 3 and the crown main groove 5, an outboard shoulder land region 8 between the outboard shoulder main groove 4 and the outboard tread edge To, and an outboard middle land region 9 between the outboard shoulder main groove 4 and the crown main groove 5.

Figure 2:
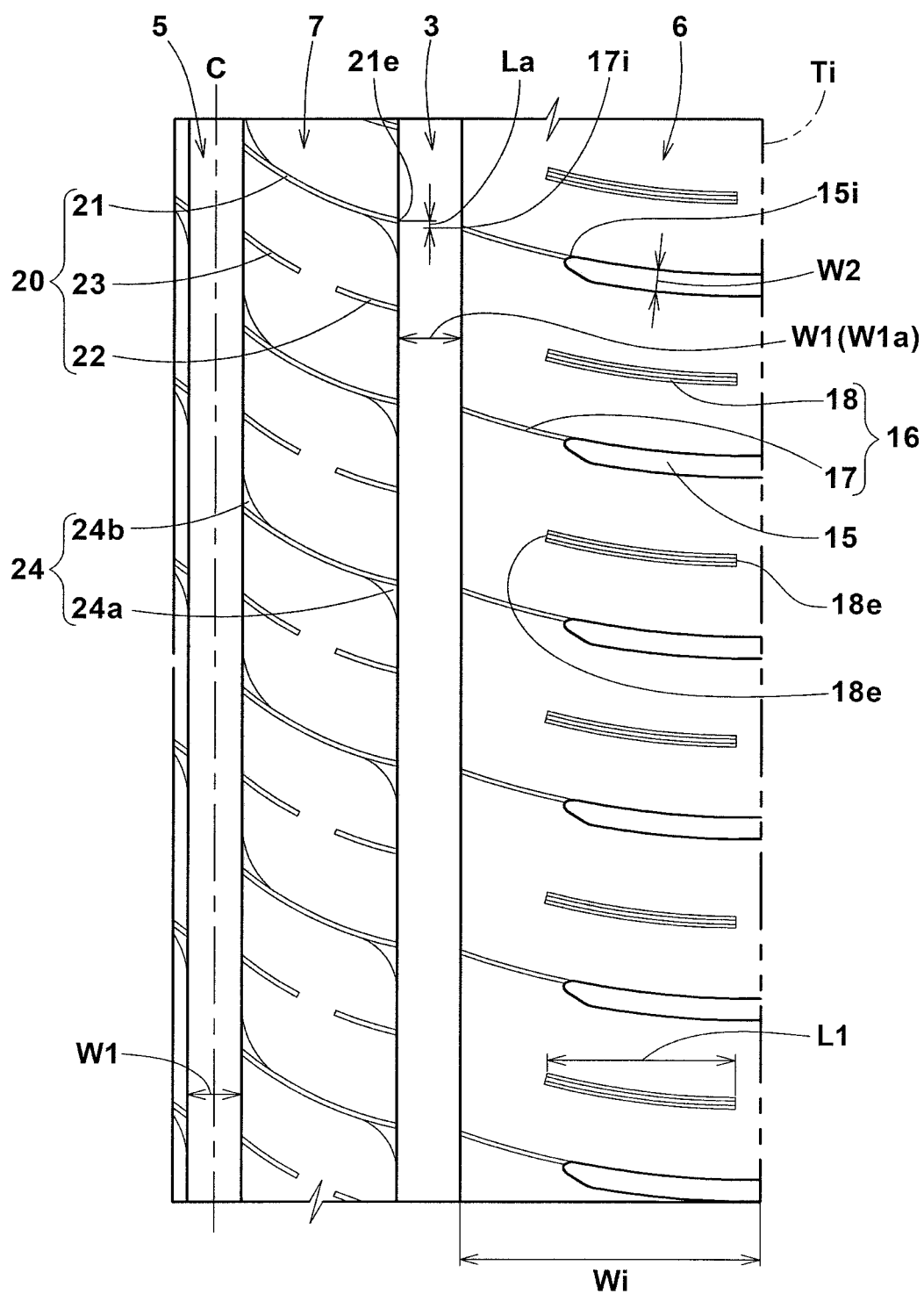
FIG. 2 is an enlarged partial view showing the inboard shoulder land region and the inboard middle land region thereof.

The inboard shoulder land region 6 is provided with inboard shoulder lateral grooves 15 and inboard shoulder sipes 16 as shown in FIG. 2.

In the present invention, the term "sipe" means a very narrow groove whose width is less than 2.0 mm inclusive of a cut having no substantial width. Thus, the term "groove" means a groove whose width is 2.0 mm or more.

The inboard shoulder lateral grooves 15 extend axially inwardly from the inboard tread edge Ti, while inclining with respect to the tire axial direction to one circumferential direction, and terminate within the inboard shoulder land region 6.

It is preferable that the groove width w2 of the inboard shoulder lateral grooves 15 is set in a range from 20% to 50% of the groove width w1 of the inboard shoulder main groove 3, and the groove depth of the inboard shoulder lateral grooves 15 is set in a range from 70% to 95% of the groove depth D1 of the inboard shoulder main groove 3 in order to smoothly lead water in the inboard shoulder lateral grooves 15 toward the outside of the inboard tread edge Ti.

The inboard shoulder sipes 16 include first inboard shoulder sipes 17 and second inboard shoulder sipes 18.

The first inboard shoulder sipes 17 respectively extend from the axially inner ends 15i of the inboard shoulder lateral grooves 15 to the inboard shoulder main groove 3, while inclining with respect to the tire axial direction to the above-said one circumferential direction. Therefore, the rigidity of the inboard shoulder land region 6 is maintained in a portion axially inside the axially inner ends 15i of the inboard shoulder lateral grooves 15.

In this example, the first inboard shoulder sipe 17 extends on an extension of one of edge lines of the inboard shoulder lateral groove 15 on the side of the above-said one circumferential direction.

Each of the second inboard shoulder sipes 18 has an axially inner end and outer end 18e terminating within the inboard shoulder land region 6, and is inclined with respect to the tire axial direction to the above-said one circumferential direction while extending from the axially outer end to the axially inner end.

Figure 3A:
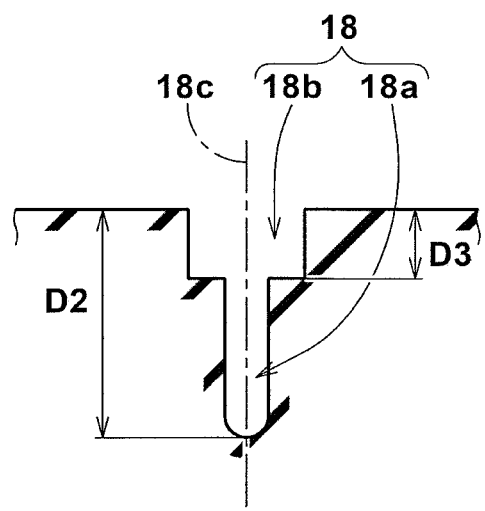
FIG. 3(a) is a cross sectional view taken along a line A-A of FIG. 1.

AS shown in FIG. 3(a) which shows a cross section of the second inboard shoulder sipe 18 perpendicular to the longitudinal direction thereof, the second inboard shoulder sipe 18 has a deep bottom part 18a centered on the widthwise center line 18c of the second inboard shoulder sipe 18, and a shallow bottom part 18b on each side in the tire circumferential direction of the deep bottom part 18a. In the initial stage of the tread wear life, the second inboard shoulder sipes 18 exert large edge effect due to supple edge portions and at the same time absorb water film existing between the inboard shoulder land region 6 and the road surface, therefore, the wet performance is improved.

In the middle and later stages when the shallow bottom part 18b is worn out, the deep bottom part 18a still exists, and the rigidity of the land region is controlled to maintain the steering stability.

In order to effectively derive such functions, it is desirable that the depth D2 of the deep bottom part 18a is about 3 to 5 mm, and the depth D3 of the shallow bottom parts 18b is about 0.5 to 2 mm.

The axial length L1 of the second inboard shoulder sipes 18 is preferably 50% to 80% of the axial width wi of the inboard shoulder land region 6 as shown in FIG. 2.

The inboard middle land region 7 is provided with inboard middle sipes 20 inclined in the same direction as the inboard shoulder sipes 16. Therefore, a water film on the road surface which is broken by the edges of the sipes 16 and 20 is smoothly led to one direction as each edge gradually contacts with the road surface from one end to the other end. As a result, the wet performance can be improved.

In the present embodiment, the inboard middle sipes 20 include traversing inboard middle sipes 21, axially outer inboard middle sipes 22, and axially inner inboard middle sipes 23.

The traversing inboard middle sipes 21 extend from the inboard shoulder main groove 3 to the crown main groove 5. The axially outer inboard middle sipes 22 extend from the inboard shoulder main groove 3 toward the tire equator c and terminate within the inboard middle land region 7. The axially inner inboard middle sipes 23 extend from the crown main groove 5 toward the inboard tread edge Ti and terminate within the inboard middle land region 7.

The axially outer ends 21e of the traversing inboard middle sipes 21 are respectively positioned closely to the axially inner ends 17i of the first inboard shoulder sipes 17 through the inboard shoulder main groove 3, in other words, the circumferential positions of the axially outer ends 21e are respectively close to those of the axially inner ends 17i. Thereby, the above described effect to lead the water film to one direction is furthered to assure the improvement of the wet performance.

In order to effectively derive such advantageous effect, the circumferential distances La between the axially outer ends 21e and the axially inner ends 17i are preferably not greater than 20%, more preferably not greater than 10% of the groove width w1a of the inboard shoulder main groove 3.

Each of the axially inner inboard middle sipes 23 and one of the axially outer inboard middle sipes 22 are formed on a smoothly curved arc line 22k. Thereby, the rigidity of the inboard middle land region 7 is maintained to improve the steering stability, and the wet performance is improved.

It is preferable that the depth D4 of the traversing inboard middle sipes 21 is greater than the depth of the axially inner inboard middle sipes 23 which is greater than the depth D5 of the axially outer inboard middle sipes 22.

Thereby, the deepest and longest traversing inboard middle sipes 21 can effectively exert the edge effect, scratching effect and water film removing effect to improve the wet performance. Further, as the axially inner inboard middle sipes 23 are deeper than the axially outer inboard middle sipes 22, the rigidity of the inboard middle land region 7 becomes higher in an inboard tread edge side portion subjected to a larger lateral force during cornering, therefore, the steering stability and wet performance can be improve in a good balance.

In order to effectively derive the above-mentioned advantageous effects, it is preferred that the depth D4 of the traversing inboard middle sipes 21 is 4 to 7 mm, the depth D5 of the axially outer inboard middle sipes 22 is 1.5 to 3.5 mm, and the depth of the axially inner inboard middle sipes 23 is 2.5 to 4.5 mm.

In the present embodiment, the radially outer surface 7a of the inboard middle land region 7 is provided with corner slopes 24. As shown in FIG. 2, the corner slopes 24 include axially outer inboard corner slopes 24a and axially outer inboard corner slopes 24b.

It has been known to provide a chamfer at an acute-angled corner of a tread block. However, the axially outer inboard corner slopes 24a are formed at obtuse-angled corners between the traversing inboard middle sipes 21 and the inboard shoulder main groove 3, and the axially outer inboard corner slopes 24b are formed at obtuse-angled corners between the traversing inboard middle sipes 21 and the crown main groove 5.

Such corner slopes 24 can lead a water film existing between the radially outer surface 7a and the road surface toward the adjacent main grooves 3 and 5, and further can prevent the adjacent sipes from being completely closed in the ground contacting patch which reduces the edge effect. Therefore, the wet performance can be improved, without sacrificing the steering stability.

In this example, in order to effectively derive such effect, the corner slope 24 is a part of a sphere, and the line of intersection between the corner slope 24 and the radially outer surface 7a is a circular arc.

In this example, acute-angled corners are not provided with chamfers although it may be possible to provide chamfers.

The axially outer inboard corner slopes 24a are disposed on the same sides of the respective traversing inboard middle sipes 21 in the tire circumferential direction, whereas the axially outer inboard corner slopes 24b are disposed on the opposite sides of the respective traversing inboard middle sipes 21 in order to provide even rigidity for the portions of the land region 7 on both sides of each traversing inboard middle sipe 21.

It is preferable that the depth D6 of each of the corner slopes 24 is less than the depth D4 of the adjacent traversing inboard middle sipe 21, specifically, set in a range from 40% to 70% of the depth D4.

Figure 5:
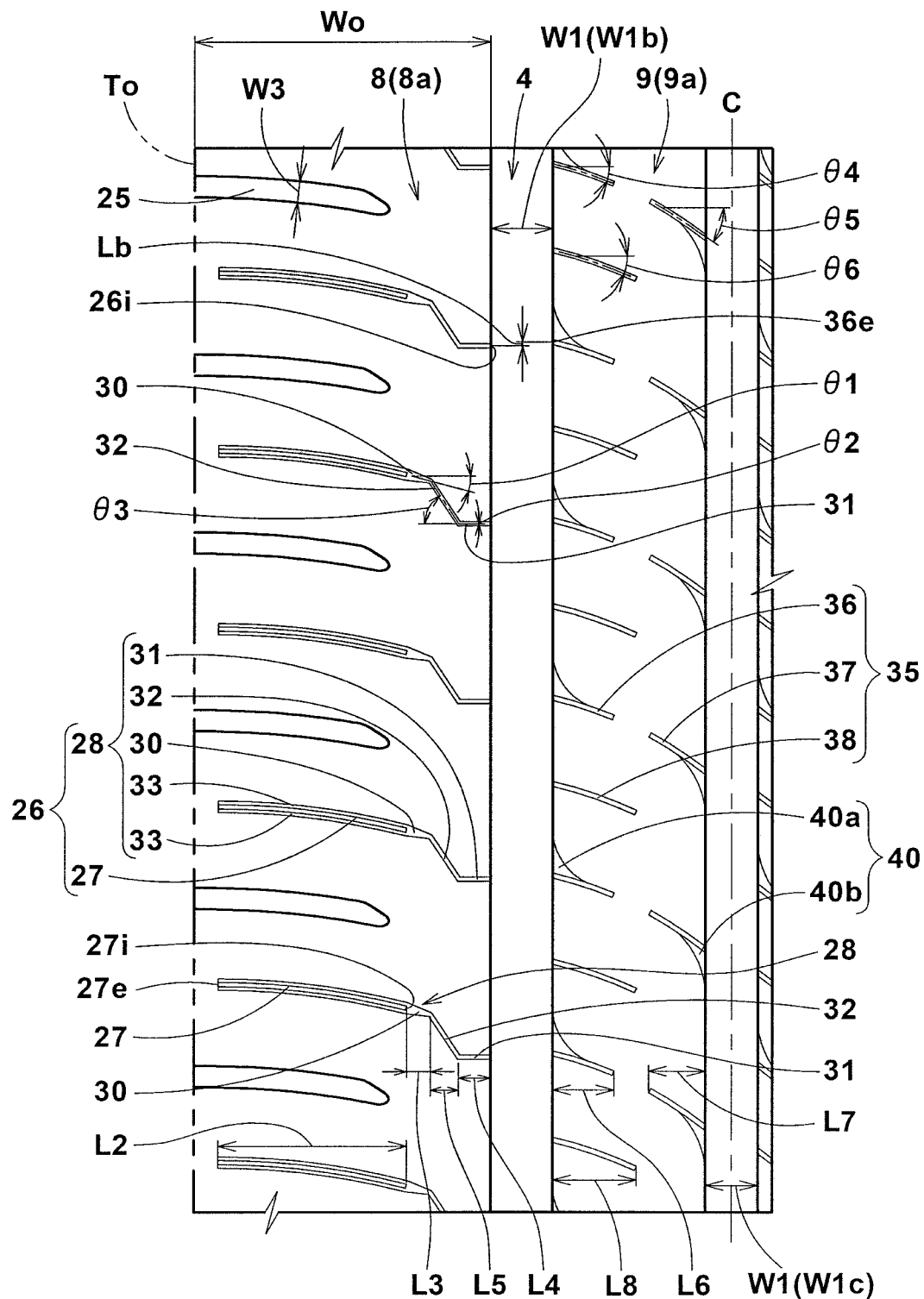
FIG. 5 is an enlarged partial view showing the outboard middle land region and the outboard shoulder land region shown in FIG. 1.
Figure 6:
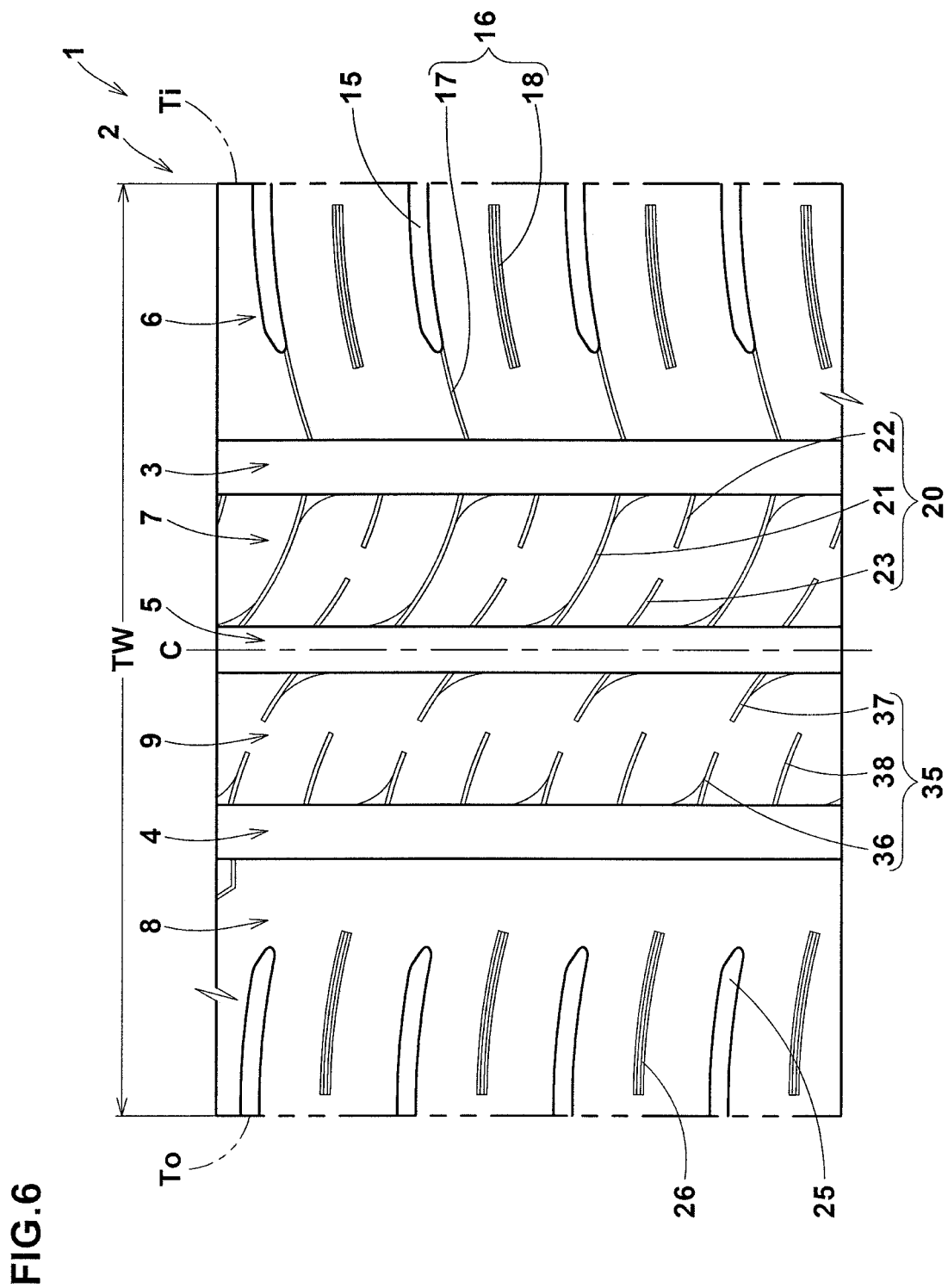
FIG. 6 is a developed partial plan view of a tire used as a comparative tire Ref1 used in the undermentioned comparison tests.

The outboard shoulder land region 8 is, as shown in FIG. 5, provided with outboard shoulder lug grooves 25 and outboard shoulder sipes 26.

The outboard shoulder lug grooves 25 extend axially inwardly from the outboard tread edge To, while inclining with respect to the tire axial direction to the opposite circumferential direction to the above-said one circumferential direction, and terminate within the outboard shoulder land region 8 in order to smoothly lead water in the outboard shoulder lug grooves 25 to the outboard tread edge To to be discharged toward the outside.

It is preferable that the groove width w3 of the outboard shoulder lug grooves 25 is set in a range from 20% to 50% of the groove width w1b of the outboard shoulder main groove 4, and the groove depth of the outboard shoulder lug grooves 25 is set in a range from 70% to 95% of the groove depth of the outboard shoulder main groove 4.

Each of the outboard shoulder sipes 26 comprises a deep bottom part 27 having an axially inner end 27i and an axially outer end 27e terminating within the outboard shoulder land region 8, and
a shallow bottom part 28 whose depth is less than that of the deep bottom part 27.

In the initial stage of the tread wear life, the outboard shoulder sipes 26 exert large edge effect due to supple edge portions and absorb water film existing between the outboard shoulder land region 8 and the road surface, therefore, the wet performance is improved. In the middle and later stages when the shallow bottom part 28 is worn out, the deep bottom part 27 still exists, and the rigidity of the land region is controlled to maintain the steering stability.

It is preferable that the axial length L2 of the deep bottom part 27 is 50% to 80% of the axial width wo of the outboard shoulder land region 8.

The shallow bottom part 28 comprises, as shown in FIG. 5, an axially outer part 30 extending from the axially inner end 27i of the deep bottom part 27 toward the tire equator C, an axially inner part 31 extending from the outboard shoulder main groove 4 toward the outboard tread edge To, and a middle part 32 connecting between the axially outer part 30 and the axially inner part 31.

The axially outer part 30 is tapered toward the tire equator C, namely, the sipe width is continuously decreased while extending straight in order to make the rigidity change gradual.

The axially inner part 31 and the middle part 32 extend straight while keeping a constant sipe width.

The angle $\theta 1$ of the axially outer part 30 with respect to the tire axial direction, the angle $\theta 2$ of the axially inner part 31 with respect to the tire axial direction, and the angle $\theta 3$ of the middle part 32 with respect to the tire axial direction are different from one another.

Thus, the shallow bottom part 28 can exert an edge effect multidirectionally, while maintaining the apparent rigidity of a portion around the outboard shoulder sipe 26, to improve the wet performance and the steering stability.

In order to effectively derive such advantageous effects, it is preferred that the angle $\theta 3$ of the middle part 32 is greater than the angle $\theta 1$ of the axially outer part 30 which is greater than the angle $\theta 2$ of the axially inner part 31. More specifically, it is preferred that the angle $\theta 1$ is in a range from 12 to 22 degrees, the angle $\theta 2$ is not greater than 10 degrees, and the angle $\theta 3$ is in a range from 55 to 65 degrees.

In the present embodiment, the inclination direction with respect to the tire axial direction of the axially outer part 30 and the inclination direction with respect to the tire axial direction of the middle part 32 are opposite of the inclination direction with respect to the tire axial direction of the axially inner part 31 in order to increase the above-said apparent rigidity for improving the steering stability.

It is however also possible that the inclination direction with respect to the tire axial direction of the middle part 32 is the same as the inclination direction with respect to the tire axial direction of the axially inner part 31.

In the outboard shoulder sipe 26 in this example, the axial length L3 of the axially outer part 30, the axial length L4 of the axially inner part 31 and the axial length L5 of the middle part 32 are substantially same. Here, the expression "substantially same" means that each length L3, L4 and L5 is in a range from 25% to 45% of the total length (L3+L4+L5).

Figure 3B:
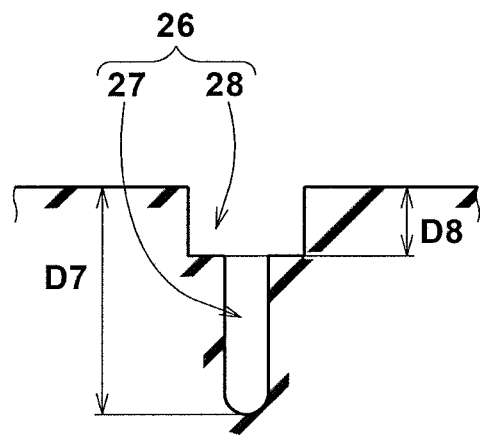
FIG. 3(b) is a cross sectional view taken along a line B-B of FIG. 1.
Figure 4:
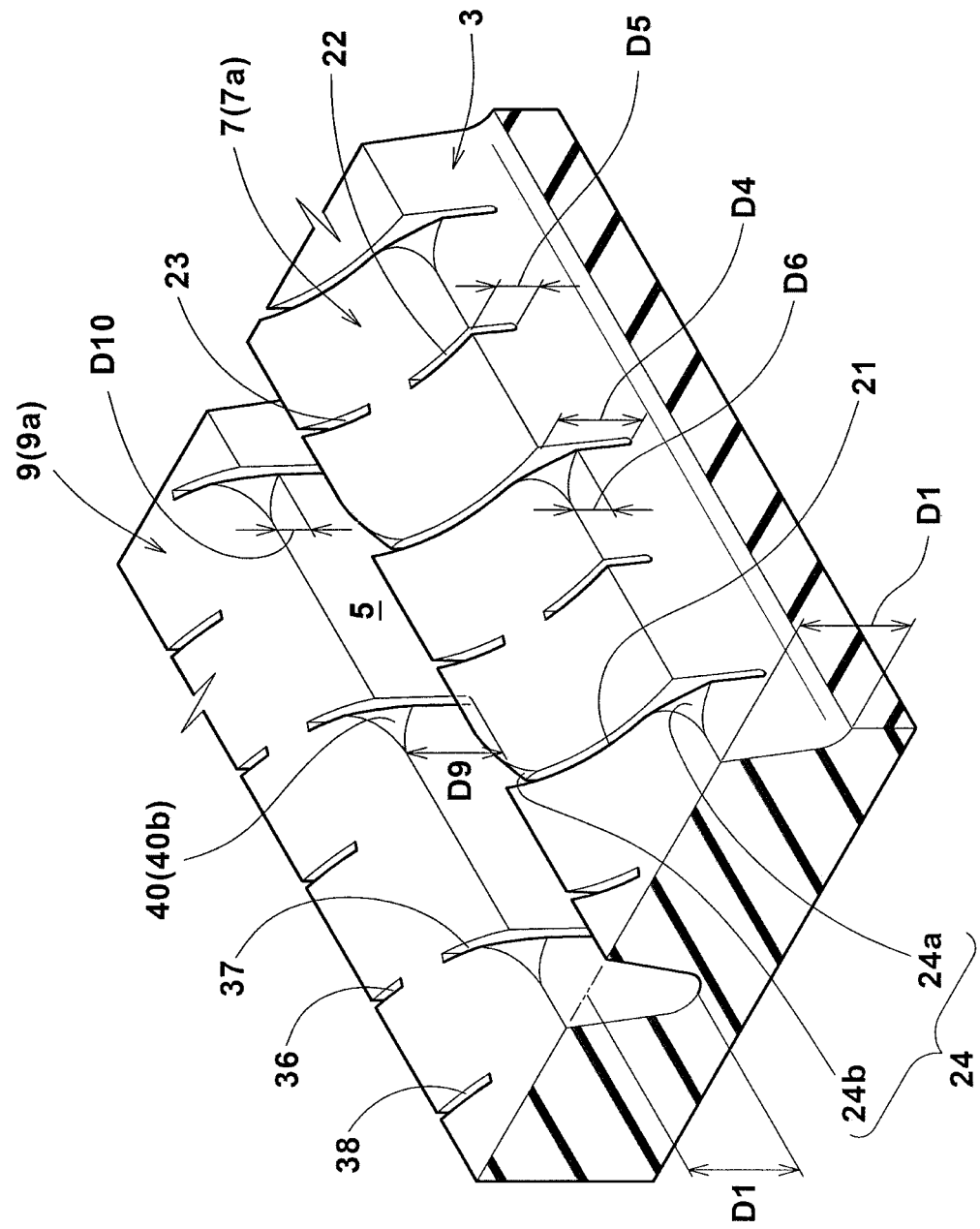
FIG. 4 is an enlarged perspective partial view showing the inboard middle land region and the outboard middle land region shown in FIG. 1.

In order to further improve the wet performance in the initial stage of the tread wear life, the shallow bottom part 28 of each of the outboard shoulder sipes 26 further comprises a fourth part 33 disposed on each side in the tire circumferential direction of the deep bottom part 27 so as to extend along the entire length L2 of the deep bottom part 27 as shown in FIG. 5 and FIG. 3(b).

In order to effectively derive the above-described advantageous effects of the outboard shoulder sipe 26, it is preferred that the depth D7 of the deep bottom part 27 is about 3 to 5 mm, and the depth D8 of the shallow bottom part 28 is about 0.5 to 2 mm.

The outboard middle land region 9 is provided with outboard middle sipes 35 as shown in FIG. 5.

All the outboard middle sipes 35 are inclined in the same direction as the inboard middle sipes 20 as shown in FIG. 1 so that, in cooperation with the inboard middle sipes 20, a water film on the road surface which is broken by the edges of the sipes 35 and 20 is smoothly led to one direction as each edge gradually contacts with the road surface from one end to the other end, and the wet performance is further improved.

The outboard middle sipes 35 include axially outer short outboard middle sipes 36, axially inner outboard middle sipes 37, and axially outer long outboard middle sipes 38.

The axially outer short outboard middle sipes 36 extend from the outboard shoulder main groove 4 toward the tire equator C, and terminate within the outboard middle land region 9.

The axially inner outboard middle sipes 37 extend from the crown main groove 5 toward the outboard tread edge To, and terminate within the outboard middle land region 9. Each of the axially inner outboard middle sipes 37 and one of the axially outer short outboard middle sipes 36 are formed on a smoothly curved arc line in order to maintain the rigidity of the outboard middle land region 9 for providing good steering stability.

The axially outer long outboard middle sipes 38 extend from the outboard shoulder main groove 4 toward the tire equator c, and as shown in FIG. 5, the axial length thereof is greater than that of the axially outer short outboard middle sipes 36 in order to effectively deal with a water film between the outboard middle land region 9 and the road surface.
Preferably, the axial length L8 of the axially outer long outboard middle sipes 38 is set in a range from 6% to 10% of the tread width TW,
the axial length L6 of the axially outer short outboard middle sipes 36 is set in a range from 3% to 6% of the tread width TW, and
the axial length L7 of the axially inner outboard middle sipes 37 is set in a range from 3% to 6% of the tread width TW.
Preferably, the depth of the axially outer long outboard middle sipes 38 is greater than the depth D9 of the axially inner outboard middle sipes 37 which is greater than the depth of the axially outer short outboard middle sipes 36.
As the sipe 38 is longest and deepest, the sipes 38 effectively exert edge effect to improve the wet performance.
As the axially inner sipe 37 are deeper than the axially outer sipes 36, an axially outer portion of the outboard middle land region 9 subjected to a large lateral force during cornering can maintain higher rigidity, therefore, the steering stability and the wet performance can be improved in good balance.

In this embodiment (passenger car tire), it is preferable that the depth of the axially outer long outboard middle sipes 38 is set in a range from 4 to 7 mm, the depth D9 of the axially inner outboard middle sipes 37 is set in a range from 2.5 to 4.5 mm, and the depth of the axially outer short outboard middle sipes 36 is set in a range from 1.5 to 3.5 mm.

It is preferable that, with respect to the tire axial direction, the angle θ4 of the axially outer short outboard middle sipe 36 is set in a range from 12 to 22 degrees, the angle θ5 of the axially inner outboard middle sipe 37 is set in a range from 35 to 45 degrees, and
the angle θ6 of the axially outer long outboard middle sipe 38 is set in a range from 12 to 22 degrees.

In the present embodiment, the radially outer surface 9a of the outboard middle land region 9 is provided with corner slopes 40 similar to the corner slopes 24.
The corner slopes 40 include
axially outer outboard corner slopes 40a formed at obtuse-angled corners between the axially outer short outboard middle sipes 36 and the outboard shoulder main groove 4, and
axially inner outboard corner slopes 40b formed at obtuse-angled corners between the axially inner outboard middle sipes 37 and the crown main groove 5.
The axially outer outboard corner slopes 40a are disposed on the same sides of the respective axially outer short outboard middle sipe 36 in the tire circumferential direction, whereas the axially inner outboard corner slopes 40b are disposed on the opposite sides of the respective axially inner outboard middle sipes 37 in the tire circumferential direction.

Preferably, the depth D10 of each of the axially inner outboard corner slopes 40b is less than the depth D9 of the adjacent axially inner outboard middle sipe 37, specifically, in a range from 40% to 70% of the groove depth D9.
Preferably, the depth of the axially outer outboard corner slopes 40a is less than the depth D9 of the axially inner outboard middle sipe 37, specifically, in a range from 40% to 70% of the groove depth D9.

Such corner slopes 40 can lead a water film existing between the radially outer surface 9a and the road surface toward the adjacent main grooves 4 and 5, and further can prevent the adjacent sipes from being completely closed in the ground contacting patch which reduces the edge effect. Therefore, the wet performance can be improved, while maintaining the steering stability.

The axially outer short outboard middle sipes 36 adjacent to the axially outer outboard corner slopes 40a are arranged such that the axially outer ends 36e of the sipes 36 are respectively positioned closely to the axially inner ends 26i of the outboard shoulder sipes 26 through the outboard shoulder main groove 4, in other words, the circumferential positions of the axially outer ends 36e are respectively close to those of the axially inner ends 26.
The circumferential distances Lb between the axially outer ends 36e and the axially inner ends 26i are not greater than 20%, more preferably not greater than 10% of the groove width w1b of the outboard shoulder main groove 4.
Thereby, portions of the outboard middle land region 9 around the axially outer ends 36 which are reduced in the rigidity by the presence of the ends 36 and corner slopes 40a are respectively situated near
portions of the outboard shoulder land region 8 around the axially inner parts 31 and middle parts 32 of the shallow bottom parts 28 which are increased in the apparent rigidity. As a result, the steering stability is maintained.

Further, the axially inner ends 37i of the axially inner outboard middle sipes 37 are respectively positioned closely to the axially inner ends 23i of the axially inner inboard middle sipes 23 as shown in FIG. 1.
Preferably, the circumferential distances Lc between axially inner ends 37i and the axially inner ends 23i are greater than the circumferential distances La and Lb.
Preferably, the circumferential distances Lc are in a range from 35% to 65% of the groove width W1c of the crown main groove 5 in order to expedite the above-said leading of the water film toward one direction by the inboard middle sipes 20 and the outboard middle sipes 35.

While detailed description has been made of an especially preferable embodiment of the present invention, the present invention can be embodied in various forms without being limited to the illustrated embodiment.

Comparison Tests

Based on the tread pattern shown in FIG. 1, test tires of size 195/65R15 were experimentally manufactured and tested for the wet performance and steering stability. The test tires included embodiment tires Ex1-Ex19 according to the present invention and comparative tires Ref1-Ref5. Their specifications are shown in Table 1.
Common specifications are as follows.
Inboard shoulder main groove's depth: 6.2 mm
Outboard shoulder main groove's depth: 6.2 mm
Crown main groove's depth: 6.3 mm Second inboard shoulder sipes
  Deep bottom part's depth D2: 3.6 mm
  Shallow bottom part's depth D3: 1 mm
Outboard shoulder sipes
Deep bottom part's depth D8: 3.6 mm
Inner part inclined to the opposite direction to outer part and
Middle part with respect to the tire axial direction Steering Stability and Wet Performance Using a 2000cc rear-wheel-drive passenger car provided on all the wheels (rim size 16×7.0) with test tires (tire pressure 200 kPa), a test driver evaluated the steering stability and wet performance based on the traction performance, braking performance and cornering performance during running on a wet road covered with a water film of less than 1 mm and also a dry asphalt road in a test course.
The results are indicated in Table 1 by an index based on comparative tire Ref1 being 100, wherein the larger value is better.

TABLE 1

| Tire | Ref1 | Ex1 | Ref2 | Ex2 | Ex3 | Ex4 | Ex5 | Ref3 | Ref4 | Ref5 | Ex6 | Ex7 |
|---|---|---|---|---|---|---|---|---|---|---|---|---|
| Tread pattern (FIG. no.) outboard shoulder sipe | 6 | 1 | 1 | 1 | 1 | 1 | 1 | 1 | 1 | 1 | 1 | 1 |
| shallow bottom part depth D7(mm) | 1 | 1 | 3.6 | 0.3 | 0.5 | 2 | 2.5 | 1 | 1 | 1 | 1 | 1 |
| axially outer part angle θ1 (deg.) | — | 17 | 17 | 17 | 17 | 17 | 17 | 17 | 17 | 17 | 10 | 12 |
| axially inner part angle θ2 (deg.) | — | 5 | 5 | 5 | 5 | 5 | 5 | 5 | 5 | 17 | 5 | 5 |
| middle part angle θ3 (deg.) | — | 60 | 60 | 60 | 60 | 60 | 60 | 17 | 5 | 60 | 60 | 60 |
| distance La/groove width W1a (%) | 10 | 10 | 10 | 10 | 10 | 10 | 10 | 10 | 10 | 10 | 10 | 10 |
| distance Lb/groove width W1b (%) | — | 10 | 10 | 10 | 10 | 10 | 10 | 10 | 10 | 10 | 10 | 10 |
| distance Lc/groove width W1c (%) | 50 | 50 | 50 | 50 | 50 | 50 | 50 | 50 | 50 | 50 | 50 | 50 |
| wet performance | 100 | 110 | 112 | 106 | 110 | 110 | 111 | 103 | 103 | 103 | 108 | 110 |
| steering stability | 100 | 102 | 95 | 103 | 102 | 102 | 100 | 102 | 102 | 102 | 101 | 102 |

| Tire | Ex8 | Ex9 | Ex10 | Ex11 | Ex12 | Ex13 | Ex14 | Ex15 | Ex16 | Ex17 | Ex18 | Ex19 |
|---|---|---|---|---|---|---|---|---|---|---|---|---|
| Tread pattern (FIG. no.) outboard shoulder sipe | 1 | 1 | 1 | 1 | 1 | 1 | 1 | 1 | 1 | 1 | 1 | 1 |
| shallow bottom part depth D7(mm) | 1 | 1 | 1 | 1 | 1 | 1 | 1 | 1 | 1 | 1 | 1 | 1 |
| axially outer part angle θ1 (deg.) | 22 | 25 | 17 | 17 | 17 | 17 | 17 | 17 | 17 | 17 | 17 | 17 |
| axially inner part angle θ2 (deg.) | 5 | 5 | 5 | 5 | 5 | 5 | 5 | 5 | 5 | 5 | 5 | 5 |
| middle part angle θ3 (deg.) | 60 | 60 | 50 | 55 | 65 | 70 | 60 | 60 | 60 | 60 | 60 | 60 |
| distance La/groove width W1a (%) | 10 | 10 | 10 | 10 | 10 | 10 | 25 | 20 | 10 | 10 | 10 | 10 |
| distance Lb/groove width W1b (%) | 10 | 10 | 10 | 10 | 10 | 10 | 10 | 10 | 10 | 10 | 10 | 10 |
| distance Lc/groove width W1c (%) | 50 | 50 | 50 | 50 | 50 | 50 | 50 | 50 | 30 | 35 | 65 | 70 |
| wet performance | 110 | 108 | 109 | 110 | 110 | 108 | 108 | 110 | 111 | 110 | 110 | 106 |
| steering stability | 102 | 101 | 101 | 102 | 102 | 102 | 103 | 102 | 100 | 102 | 102 | 103 |

From the test results, it was confirmed that the embodiment tires were improved in the wet performance and steering stability in good balance in comparison with the comparative tires.

REFERENCE SIGNS LIST

1 tire
7 inboard middle land region
8 outboard shoulder land region
16 inboard shoulder sipe
20 inboard middle sipe
26 outboard shoulder sipe
27 deep bottom part
28 shallow bottom part
30 axially outer part
31 axially inner part
32 middle part
C tire equator

The invention claimed is:
1. A tire comprising:
a tread portion having an outboard tread edge to be positioned away from the center of a vehicle body and an inboard tread edge to be positioned close to the center of the vehicle body, the tread portion provided with main grooves extending continuously in the tire circumferential direction so as to be axially divided into land regions,
the main grooves including an inboard shoulder main groove, an outboard shoulder main groove and a crown main groove therebetween,
the land regions including an inboard shoulder land region defined between the inboard shoulder main groove and the inboard tread edge, an inboard middle land region defined between the inboard shoulder main groove and the crown main groove, an outboard middle land region defined between the crown main groove and the outboard shoulder main groove, and an outboard shoulder land region defined between the outboard shoulder main groove and the outboard tread edge,
wherein
inboard shoulder sipes are disposed in only the inboard shoulder land region,
outboard shoulder sipes are disposed in only the outboard shoulder land region, and
inboard middle sipes are disposed in only the inboard middle land region,
the inboard shoulder sipes and the inboard middle sipes are inclined in the same direction with respect to the tire axial direction,
each of the inboard shoulder sipes has axially inner and outer ends both terminated within the inboard shoulder land region,
each of the outboard shoulder sipes comprises
  a deep bottom part having a depth from the radially outer surface of the outboard shoulder land region and having axially inner and outer ends within the outboard shoulder land region, and a shallow bottom part having a depth from the radially outer surface of the outboard shoulder land region which is less than the depth of the deep bottom part and extending from the axially inner end of the deep bottom part to the outboard shoulder main groove, the shallow bottom part being composed of
an axially outer part extending at an angle $\theta 1$ with respect to the tire axial direction from the axially inner end of the deep bottom part toward the tire equator,
an axially inner part extending at an angle $\theta 2$ with respect to the tire axial direction from the outboard shoulder main groove toward the outboard tread edge, and
a middle part extending at an angle $\theta 3$ with respect to the tire axial direction between the axially outer part and the axially inner part, and
the angle $\theta 1$ of the axially outer part, the angle $\theta 2$ of the axially inner part and the angle $\theta 3$ of the middle part are different from each other,
the inboard shoulder lateral grooves are disposed in only the inboard shoulder land region, and each extend axially inwardly from the inboard tread edge and each have an axially inner end within the inboard shoulder land region,
second inboard shoulder Sipes are disposed in only the inboard shoulder land region, and respectively extend from the axially inner ends of the inboard shoulder lateral grooves to the inboard shoulder main groove, and
outboard shoulder lug grooves are disposed in only the outboard shoulder land region, and each extend axially inwardly from the outboard tread edge and each terminate within the outboard shoulder land region.

2. The tire according to claim 1, wherein
the angle $\theta 3$ of the middle part with respect to the tire axial direction is greater than the angle $\theta 1$ of the axially outer part with respect to the tire axial direction, and
the angle $\theta 1$ of the axially outer part is greater than the angle $\theta 2$ of the axially inner part with respect to the tire axial direction.

3. The tire according to claim 2, wherein the angle $\theta 1$ of the axially outer part is 12 to 22 degrees, the angle $\theta 2$ of the axially inner part is not greater than 10 degrees, and the angle $\theta 3$ of the middle part is 55 to 65 degrees.

4. The tire according to claim 2, wherein the inclination direction with respect to the tire axial direction of the axially outer part and the inclination direction with respect to the tire axial direction of the middle part are opposite of the inclination direction with respect to the tire axial direction of the axially inner part.

5. The tire according to claim 1, wherein
outboard middle sipes are disposed in only the outboard middle land region and inclined with respect to the tire axial direction to the same direction as the inboard middle sipes,
the outboard middle sipes include
axially outer short outboard middle sipes extending from the outboard shoulder main groove toward the tire equator and terminating within the outboard middle land region,
axially inner outboard middle sipes extending from the crown main groove toward the outboard tread edge and terminating within the outboard middle land region, and
axially outer long outboard middle sipes extending from the outboard shoulder main groove toward the tire equator and having an axial length larger than the axially outer short outboard middle sipe,
the depth of the axially outer long outboard middle sipes is greater than the depth of the axially inner outboard middle sipes, and
the depth of the axially inner outboard middle sipes is greater than the depth of the axially outer short outboard middle sipes.

6. The tire according to claim 5, wherein
the radially outer surface of the outboard middle land region is provided with
axially outer outboard corner slopes at corners between the axially outer short outboard middle sipes and the outboard shoulder main groove
axially inner outboard corner slopes at corners between the axially inner outboard middle sipes and the crown main groove, and
each of the axially outer and inner corner slopes is a part of a sphere, and the line of intersection between the corner slope and the radially outer surface is a circular arc.

7. The tire according to claim 1, wherein
the inboard middle sipes include
traversing inboard middle sipes extending from the inboard shoulder main groove to the crown main groove,
axially outer inboard middle sipes extending from the inboard shoulder main groove toward the tire equator and terminating within the inboard middle land region, and
axially inner inboard middle sipes extending from the crown main groove toward the inboard tread edge and terminating within the inboard middle land region, and
the depth of the traversing inboard middle sipes is greater than the depth of the axially inner inboard middle sipes, and
the depth of the axially inner inboard middle sipes is greater than the depth of the axially outer inboard middle sipes.

8. The tire according to claim 7, wherein
the radially outer surface of the inboard middle land region is provided with
axially outer inboard corner slopes at corners between the traversing inboard middle sipes and the inboard shoulder main groove, and
axially outer inboard corner slopes at corners between the traversing inboard middle sipes and the crown main groove.

9. The tire according to claim 1, wherein in said shallow bottom part, the axially inner part extends straight, and the middle part extends straight.

10. The tire according to claim 9, wherein in said shallow bottom part, the axially inner part has a constant width, the middle part has a constant width, and the axially outer part tapers toward the middle part.

11. The tire according to claim 6, wherein the corners on which the axially outer and inner corner slopes are formed are obtuse angle corners, and acute angled corners are not provided with the corner slopes.

12. The tire according to claim 7, wherein inboard middle sipes are disposed in only the inboard middle land region.

* * * * *